United States Patent [19]

Hougaard

[11] Patent Number: 4,989,034
[45] Date of Patent: Jan. 29, 1991

[54] METHOD OF ELIMINATING CUSHION DISTORTION

[75] Inventor: Finn Hougaard, Copenhagen, Denmark

[73] Assignee: Eskofot A/S, Ballerup, Denmark

[21] Appl. No.: 463,881

[22] Filed: Jan. 10, 1990

Related U.S. Application Data

[63] Continuation of Ser. No. 184,840, Apr. 22, 1988, abandoned.

[30] Foreign Application Priority Data

May 4, 1987 [DK] Denmark ............................ 2273/87

[51] Int. Cl.$^5$ ............................................. G03B 27/68
[52] U.S. Cl. ......................................... 355/52; 355/47
[58] Field of Search ............................. 355/52, 30, 47

[56] References Cited

U.S. PATENT DOCUMENTS

| 1,541,555 | 6/1925 | Fairchild et al. ..................... 355/52 |
| 4,541,688 | 9/1985 | Watt et al. . | |
| 4,678,321 | 7/1987 | Inokuchi .............................. 355/52 |

FOREIGN PATENT DOCUMENTS

| 460335 | 1/1937 | United Kingdom . |
| 735745 | 8/1955 | United Kingdom . |
| 897361 | 5/1962 | United Kingdom . |
| 2000601 | 1/1979 | United Kingdom . |
| 2186709 | 8/1987 | United Kingdom . |

OTHER PUBLICATIONS

*Aberrations of the Symmetrical Optical System*, W. T. Welford, 1974, Academic Press, PTO Scientific Library, p. 188.

*Primary Examiner*—Monroe H. Hayes
*Attorney, Agent, or Firm*—Cushman, Darby & Cushman

[57] ABSTRACT

A method of eliminating cushion distortion when adjusting reproduction equipment comprising a picture plane, an objective plane, and an original plane. The cushion distortion results optionally from a glass plate being inserted in the path of the rays. The invention is based on the principle that the direction of light is the same irrespective of the direction in which the light moves. By employing this principle a cushion distorted picture can be reproduced as an undistorted picture if an additional glass plate of a suitable thickness is inserted in the path of the rays. The additional glass plate must, however, be situated on the opposite side of the objective. A glass plate supporting the light-sensitive material is not quite plane either which per se can result in a certain degree of cushion distortion. Such a distortion can also be eliminated by the insertion of an additional glass plate in the path of the rays.

8 Claims, 4 Drawing Sheets

No distortion if $b = b'$ $b' = a \tan i$ $b = a \cdot n \cdot \tan u$ $b = b' \Rightarrow \dfrac{\tan i}{\tan u} = n \Rightarrow$ $\dfrac{\tan i}{\tan u} = \dfrac{\sin i}{\sin u}$

METHOD OF ELIMINATING CUSHION DISTORTION

This is a continuation of application Ser. No. 184,840, filed Apr. 22, 1988, which was abandoned upon the filing hereof.

TECHNICAL FIELD

The invention relates to a method of eliminating cushion distortion when adjusting reproduction equipment comprising a picture plane, an objective plane, and an original plane, said cushion distortion optionally resulting from a glass plate being inserted in the path of the rays.

BACKGROUND ART

Such a glass plate results in a cushion distorted picture.

SUMMARY OF THE INVENTION

The object of the invention is to eliminate such a cushion distortion by simple means.

The invention is based on the principle that the direction of light is the same irrespective of the direction in which the light moves. By employing this principle a cushion distorted picture can be reproduced as an undistorted picture if an additional glass plate of a suitable thickness is inserted in the path of the rays. As a result it is possible to eliminate the effect of the first glass plate in the path of the rays by inserting an additional glass plate of the same thickness in the path of the rays. The additional glass plate must, however, be situated on the opposite side of the objective.

BRIEF DESCRIPTION OF THE DRAWINGS

In order that the present invention may be readily carried into effect, it will now be described with reference to the accompanying drawings, in which.

DESCRIPTION OF PREFERRED EMBODIMENTS

Figure 1:
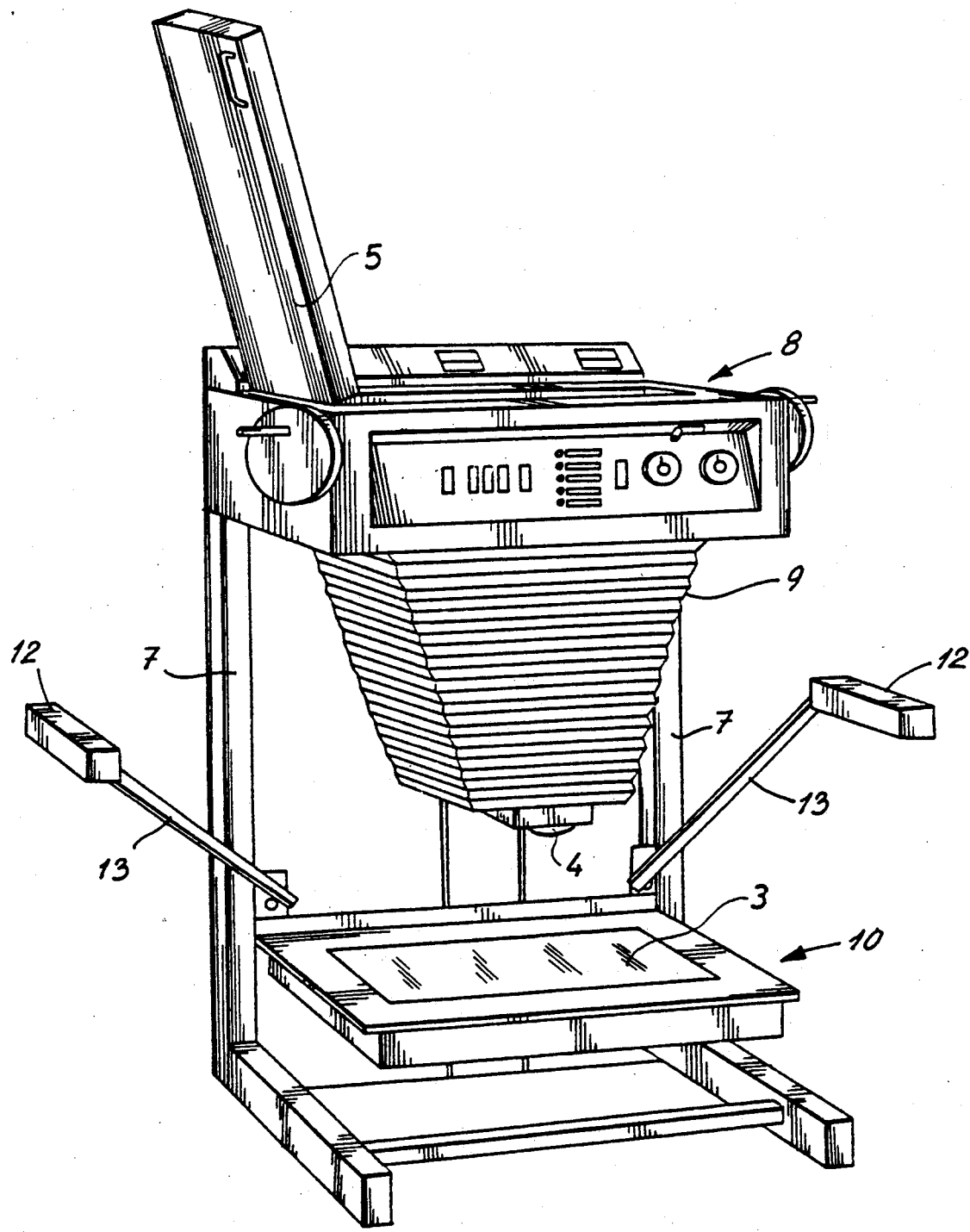
FIG. 1 illustrates a reproduction camera according to the invention.
Figure 2:
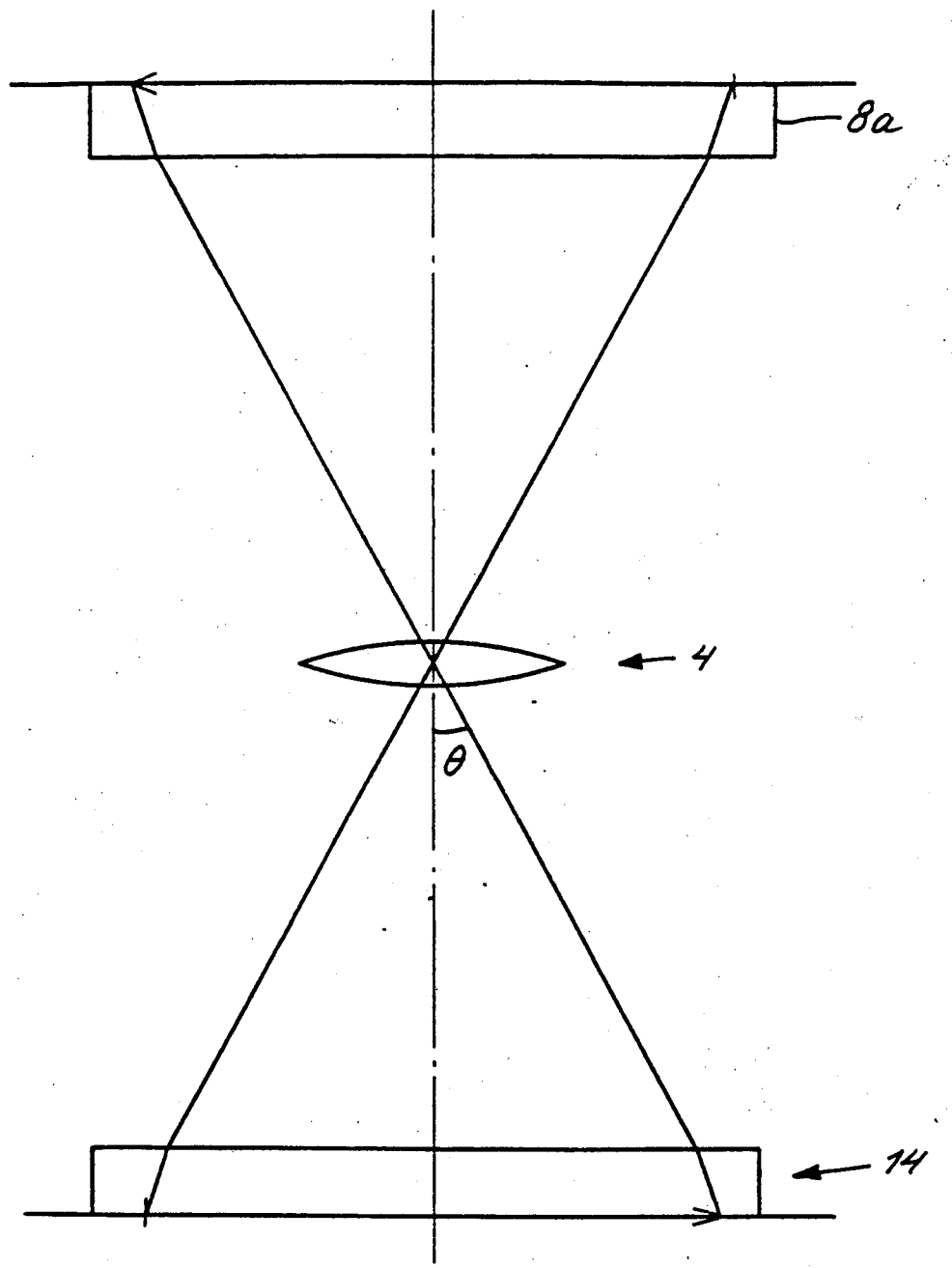
FIG. 2 illustrates the path of rays in the reproduction camera of FIG. 1.

FIG. 1 illustrates a reproduction camera comprising a frame 7. At the top this frame 7 carries a permanent table 8 with a glass plate 8a, on which a sheet of light-sensitive material can be placed. A lid 5 can be placed on the glass plate 8a so as to keep said sheet of light-sensitive material in position. A photo-graphic objective 4 is carried by an up and downwardly displaceable bellows 9. A table 10 is situated below the objective 4 and is mounted in two vertical guides 7. The table 10 can be moved up and downwards, i.e. towards and away from the objective 4. This table 10 supports a glass plate 3 on which the original can be placed. Illuminating means 12 situated on pivotal arms 13 are adapted to expose the original on the table 10.

Figure 3:
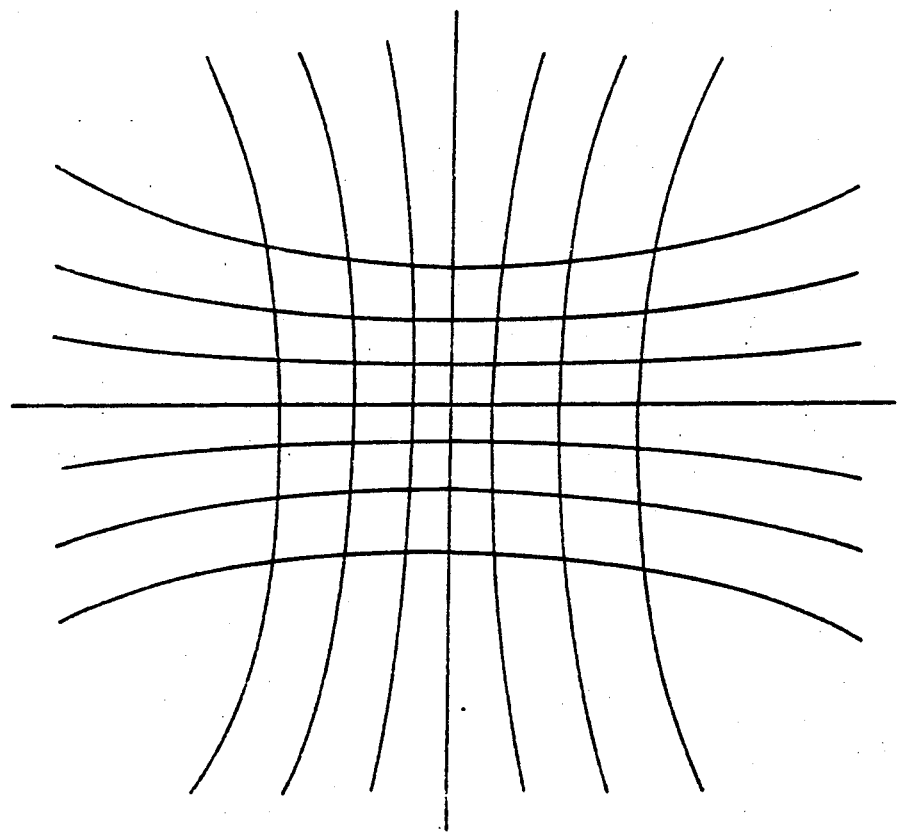
FIG. 3 illustrates the cushion distortion resulting from insertion of a glass plate in the path of the rays.
Figure 4:
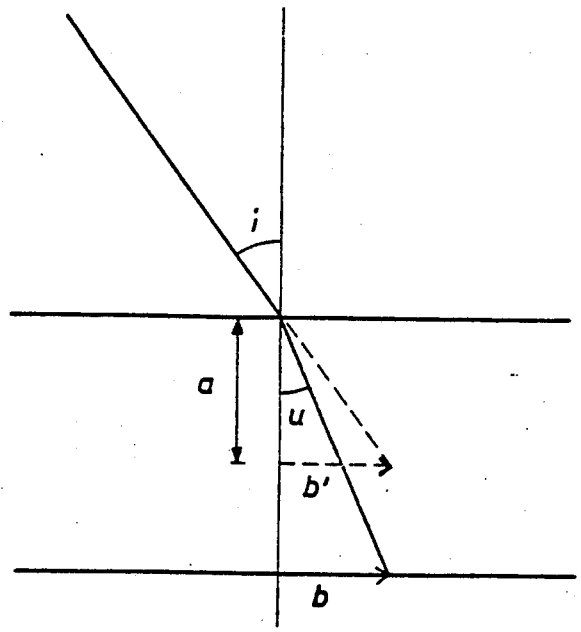
FIG. 4 illustrates how the geometric distortion is calculated.

Geometric distortion occurs when the magnification of a lens 4 depends on the angle $\theta$ formed by the center ray of the bundle of rays and the axis. When the magnification increases with this angle $\theta$ the outermost portions of the picture field are reproduced relatively far out. A square is then reproduced as shown in FIG. 3, i.e. with cushion distortion. When the magnification on the contrary decreases with the angle the outermost portions are reproduced too close to the axis, i.e. with barrel-shaped distortion.

Symmetric lens systems provide a reproduction without distortion, i.e. orthoscopic reproduction, in connection with the magnification of one and with approximation in connection with other magnifications too.

The reproduction camera according to the invention involves the use of a symmetric lens system 4. However, a cushion distortion occurs at the insertion of a glass plate in the path of the rays. No distortion occurs, however, if $$\frac{\sin i}{\sin u} \approx \frac{\tan i}{\tan u}$$

i.e. as far as small angles are concerned. A certain degree of distortion occurs only in connection with large angles. The invention is based on the principle that the direction of light is the same irrespective of the direction in which the light moves. As a result a cushion distorted picture can be reproduced as an undistorted picture if an additional glass plate 14 of a suitable thickness is inserted in the path of the rays. As a result it is possible to eliminate the effect of the first glass plate 8a in the path of the rays by inserting an additional glass plate 14 of the same thickness in the path of the rays. The additional glass plate 14 must, however, be situated on the opposite side of the objective 4.

A glass plate supporting the light-sensitive sheet is not quite plane either inter alia on account of its own weight, which per se results in a certain degree of cushion distortion. This cushion distortion can also be eliminated by inserting an additional glass plate in the path of the rays.

While the invention has been described by means of specific examples and in specific embodiments, we do not wish to be limited thereto, for obvious modifications will occur to those skilled in the art without departing from the spirit and scope of the invention.

I claim:

1. A method of eliminating cushion distortion, introduced by the use of a glass plate for the purpose of securing an original to be copied, in the use of reproduction equipment of the type having an image plane, an objective lens disposed in an objective plane and a plane for the original to be reproduced with the image plane and the plane for the original being located on opposite sides of said objective plane and said glass plate being disposed adjacent to said plane for the original in order to insure that said original lies flat, the method comprising the step of placing an additional glass plate on the side of the objective plane opposite said glass plate and in advance of the image plane, said additional glass plate being of the same thickness as said glass plate so as to compensate for any distortion introduced by said glass plate adjacent to said plane for the original.

2. The method of claim 1 including the step of selecting the length of the optical path of said additional glass plate to compensate for the degree of distortion.

3. A method of eliminating cushion distortion, introduced by the use of a glass plate for securing an original to be copied and as a result of the curvature of said glass plate due to gravitation forces, in the use of reproduction equipment of the type having an image plane, an objective lens disposed in an objective plane and a plane for the original to be reproduced with the image plane and the plane for the original being located on opposite sides of said objective plane and said glass plate being disposed adjacent to said plane for the original with said glass plate having a curvature due to gravitational forces, the method comprising the step of placing an additional glass plate on the side of the objective plane opposite said glass plate and in advance of the image plane, said additional glass plate being of the same thickness as said glass plate so as to compensate for any distortion introduced by said glass plate adjacent to said plane for the original.

4. The method of claim 3 including the step of selecting the length of the optical path of said additional glass plate to compensate for the degree of distortion.

5. A method of eliminating cushion distortion introduced by the use of a glass plate for the purpose of supporting a light sensitive material in the use of reproduction equipment of the type having an image plane, an objective lens disposed in an objective plane and a plane for the original to be reproduced with the image plane and the plane for the original being located on opposite sides of said objective plane and said glass plate being disposed adjacent to said image plane in order to support said light sensitive material in the image plane, the method comprising the step of placing an additional glass plate on the side of the objective plane opposite said glass plate and in advance of the plane for the original, said additional glass plate being of the same thickness of said glass plate so as to compensate for any distortion introduced by said glass plate adjacent to said image plane.

6. The method of claim 5 including the step of selecting the length of the optical path of said additional glass plate to compensate for the degree of distortion.

7. A method of eliminating cushion distortion, introduced by the use of a glass plate for supporting a light sensitive material and as a result of the curvature of said glass plate due to gravitational forces, in the use of reproduction of the type having an image plane, an objective lens disposed in an objective plane and a plane for the original to be reproduced with the image plane and the plane for the original being located on opposite sides of said objective plane and said glass plate being disposed adjacent to said image plane with said glass plate having a curvature due to gravitational forces, the method comprising the step of placing an additional glass plate on the side of the objective plane opposite said glass plate and in advance of the plane for the original, said additional glass plate being of the same thickness as said glass plate so as to compensate for any distortion introduced by said glass plate adjacent to said plane for the original.

8. The method of claim 7 including the step of selecting the length of the optical path of said additional glass plate to compensate for the degree of distortion.

* * * * *